United States Patent
Straub

(10) Patent No.: US 9,267,422 B2
(45) Date of Patent: Feb. 23, 2016

(54) COMBUSTION SYSTEM FOR AN ENGINE HAVING MULTIPLE FUEL SPRAY INDUCED VORTICES

(75) Inventor: Robert D. Straub, Lowell, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1164 days.

(21) Appl. No.: 13/274,529

(22) Filed: Oct. 17, 2011

(65) Prior Publication Data

US 2013/0092123 A1   Apr. 18, 2013

(51) Int. Cl.
*F02B 19/12* (2006.01)
*F02B 23/06* (2006.01)

(52) U.S. Cl.
CPC ........... *F02B 23/0651* (2013.01); *F02B 23/066* (2013.01); *F02B 23/069* (2013.01); *F02B 23/0669* (2013.01); *F02B 23/0672* (2013.01); *F02B 23/0687* (2013.01); *Y02T 10/125* (2013.01)

(58) Field of Classification Search
CPC ..... Y02T 10/44; Y02T 10/125; F02D 41/402; F02D 41/0025; F02D 19/081
USPC .......................... 123/298, 299, 301, 306, 307
See application file for complete search history.

(56) References Cited

U.S. PATENT DOCUMENTS

| | | | | | |
|---|---|---|---|---|---|
| 5,622,150 | A | * | 4/1997 | Fraidl et al. | 123/307 |
| 6,062,192 | A | * | 5/2000 | Wirth et al. | 123/295 |
| 6,125,817 | A | * | 10/2000 | Piock et al. | 123/301 |
| 7,640,094 | B2 | * | 12/2009 | Ishikawa et al. | 701/105 |
| 2010/0095928 | A1 | * | 4/2010 | Eismark et al. | 123/298 |
| 2011/0083638 | A1 | * | 4/2011 | Stovell | 123/307 |
| 2011/0239983 | A1 | * | 10/2011 | Straub | 123/307 |

FOREIGN PATENT DOCUMENTS

| | | |
|---|---|---|
| CN | 101839166 A | 9/2010 |
| CN | 201635825 U | 11/2010 |
| EP | 0828066 A1 | 11/1998 |
| JP | 1193675 A | 4/1999 |
| JP | 2001214742 A | 8/2001 |
| JP | 2007270749 A | 10/2007 |
| KR | 1020050029476 A | 3/2005 |

* cited by examiner

*Primary Examiner* — Hai Huynh
*Assistant Examiner* — Raza Najmuddin
(74) *Attorney, Agent, or Firm* — Quinn Law Group, PLLC

(57) ABSTRACT

An internal combustion engine includes an engine assembly that defines a bore, and a piston disposed and moveable within the bore. The piston and the engine assembly cooperate to define a combustion chamber therebetween. A direct injection fuel system directs a fuel spray into the combustion chamber along a linear path. The combustion chamber includes a contoured surface having a plurality of annular recesses. The contoured surface divides and re-directs the fuel spray from the linear path into each of the annular recesses to form a plurality of independent rotating vortices.

20 Claims, 6 Drawing Sheets

COMBUSTION SYSTEM FOR AN ENGINE HAVING MULTIPLE FUEL SPRAY INDUCED VORTICES

TECHNICAL FIELD

The invention generally relates to a combustion system for an internal combustion engine, and a method of operating the internal combustion engine.

BACKGROUND

Modern engine assemblies, including but not limited to diesel engines, may include a direct injection fuel system having a fuel injector that directly injects a stream of fuel, i.e., a fuel spray, into a combustion chamber of the engine assembly. The fuel spray mixes with air within the combustion chamber prior to combustion. The degree of mixture achieved between the fuel spray and the air within the combustion chamber affects the fuel economy and the hydrocarbon emissions of the internal combustion engine.

SUMMARY

An internal combustion engine is provided. The internal combustion engine includes an engine assembly that defines a bore. The bore extends along a central bore axis. A piston is disposed within the bore. The piston is configured for reciprocating movement within the bore along the central bore axis. The piston and the engine assembly cooperate to define a combustion chamber therebetween. A direct injection fuel system includes a fuel injector, which is configured for injecting a fuel spray into the combustion chamber along a linear path. The combustion chamber includes a contoured surface that defines a plurality of annular recesses. The annular recesses re-direct the linear path of the fuel spray into a plurality of independent rotating vortices.

A method of operating an internal combustion engine is also provided. The method includes injecting a fuel spray along a linear path into a combustion chamber defined by a piston and an engine assembly. The fuel spray is divided into portions, and the linear path of each of the portions of the fuel spray is re-directed into a plurality of independent rotating vortices.

Accordingly, each of the plurality of annular recesses causes a portion of the fuel spray to rotate in a vortex, thereby providing a plurality of independent rotating vortices. The independent rotating vortices increase the mixing between the fuel spray and the air within the combustion chamber, thereby improving fuel efficiency, as well as hydrocarbon, soot and carbon monoxide emissions.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, an internal combustion engine is generally shown at 20. The internal combustion engine 20 may include but is not limited to a gasoline engine or a diesel engine.

Figure 1:
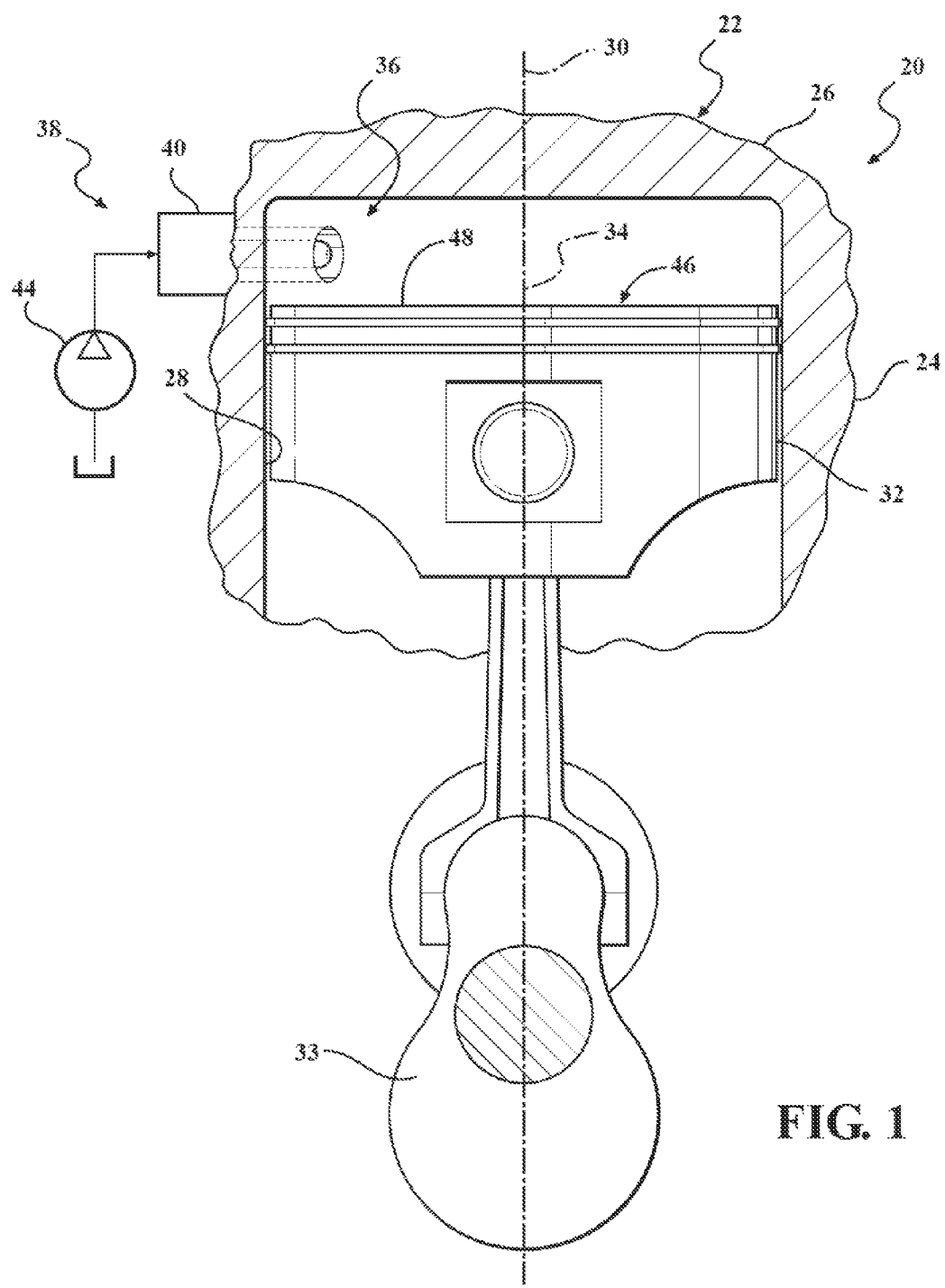
FIG. 1 is a cross sectional view of an engine assembly.

Referring to FIG. 1, the internal combustion engine 20 includes an engine assembly 22. The engine assembly 22 includes but is not limited to an engine block 24 and a cylinder head 26. The engine block 24 defines a bore 28 that extends along a central bore axis 30. The cylinder head 26 is attached to the engine block 24 adjacent the bore 28. A piston 32 is disposed within the bore 28, and is reciprocally moveable within the bore 28 along the central bore axis 30 to drive rotation of a crankshaft 33. The piston 32 includes a radial center 34 that is aligned with the central bore axis 30. The piston 32 and the engine assembly 22, and particularly the engine block 24 and the cylinder head 26, cooperate to define a combustion chamber 36 therebetween.

The internal combustion engine 20 further includes a direct injection fuel system 38. The direct injection fuel system 38 includes a fuel injector 40 in fluid communication with the combustion chamber 36. The fuel injector 40 injects a stream of fuel, i.e., fuel spray, into the combustion chamber 36. The fuel spray is injected into the combustion chamber 36 along a linear path 42. While it should be appreciated that the injected fuel spray may fan out over a distance to define a plume of injected fuel spray, a centerline of the plume extends along the straight, non-curving, linear path 42. Once injected into the combustion chamber 36, the fuel spray may mix with combustion air to form a fuel/air mixture. The direct injection fuel system 38 further includes a fuel pump 44. The fuel pump 44 provides the fuel injector 40 with pressurized fuel. For example, the fuel pump 44 may provide the fuel to the fuel injector 40 at a pressure of at least 120 MPa, and more preferably greater than 200 MPA.

As shown in FIGS. 2 through 7, the fuel injector 40 is positioned relative to the bore 28 and the piston 32 to inject the fuel spray into the combustion chamber 36 along a linear path 42 that is approximately parallel with the central bore axis 30. The fuel injector 40 is positioned so that the centerline of the fuel spray is positioned approximately co-axial with the central bore axis 30. As such, the centerline of the linear path 42 of the fuel spray is centered at the radial center 34 of the piston 32.

Figure 8:
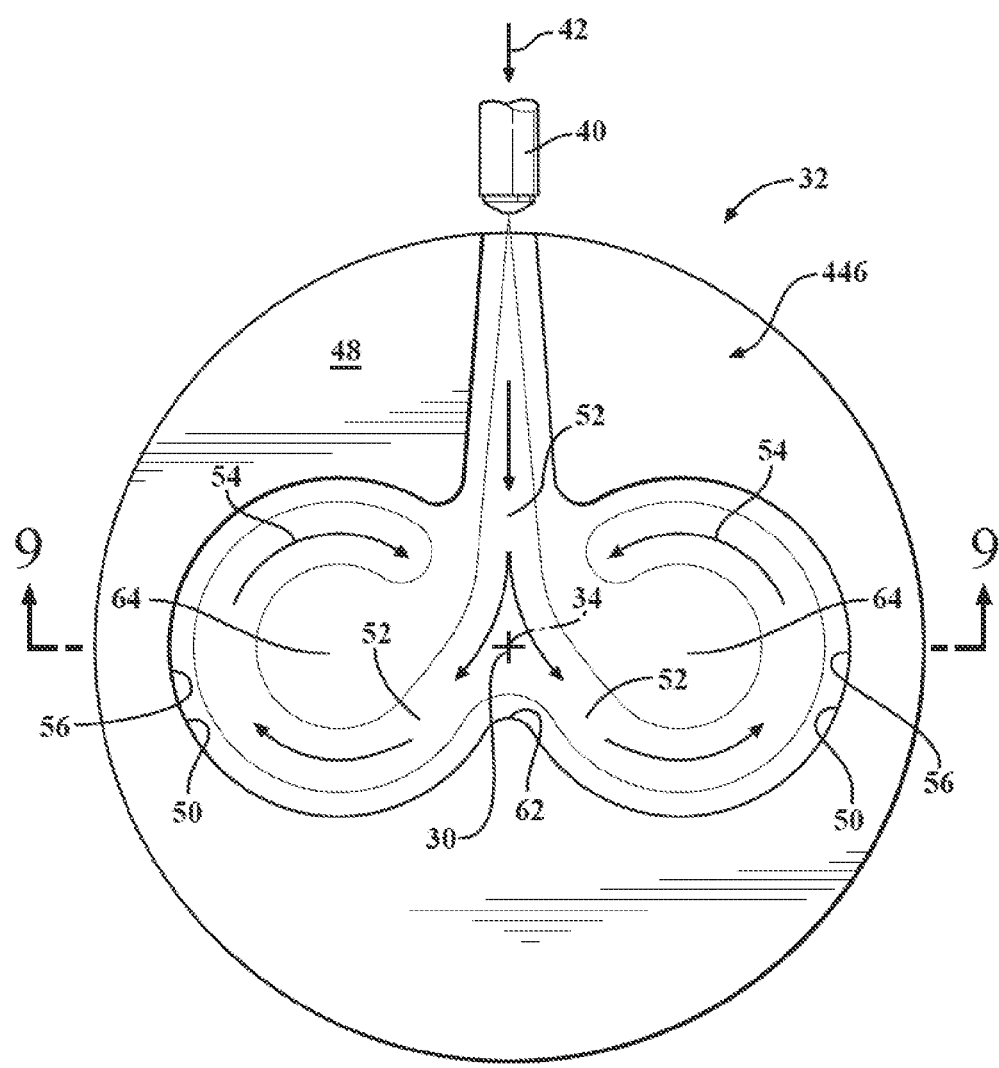
FIG. 8 is a plan view of the piston showing a fourth embodiment of the contoured surface thereof perpendicular to the central bore axis.
Figure 9:
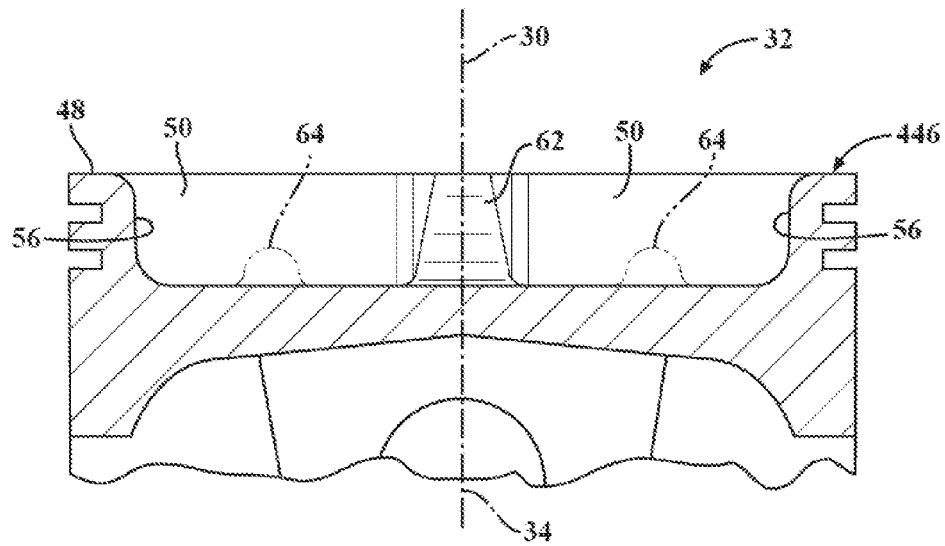
FIG. 9 is a cross sectional view of the fourth embodiment of the contoured surface parallel to the central bore axis.
Figure 10:
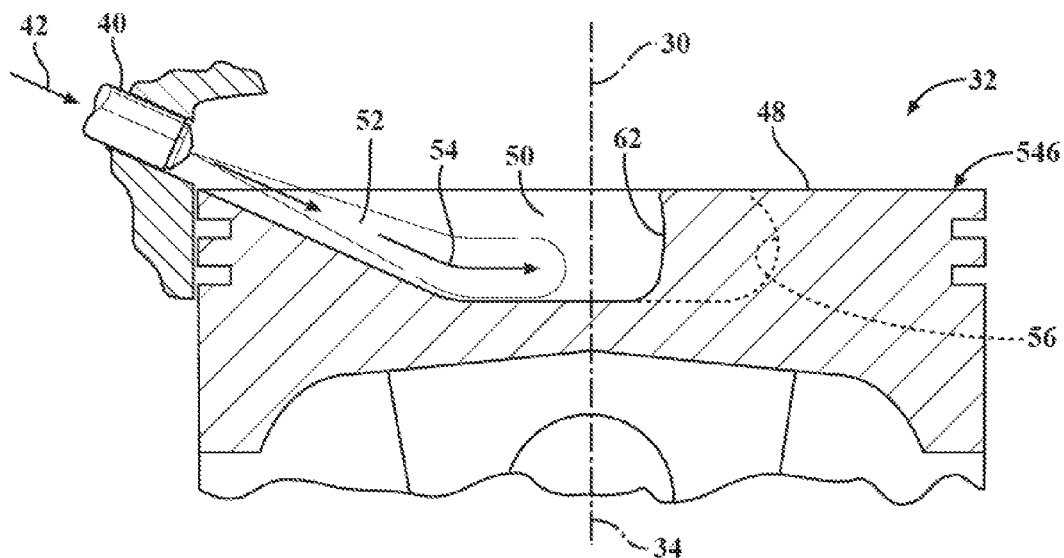
FIG. 10 is a cross sectional view of a fifth embodiment of the contoured surface parallel to the central bore axis.

Alternatively, such as shown in FIGS. 8 through 10, the fuel injector 40 may be positioned relative to the bore 28 and the piston 32 to inject the fuel spray into the combustion chamber 36 along a linear path 42 that is approximately perpendicular to the central bore axis 30. The fuel injector 40 is positioned so that the centerline of the fuel spray is positioned perpendicular to the central bore axis 30. As such, the centerline of the linear path 42 of the fuel spray intersects the radial center 34 of the piston 32. The linear path 42 of the fuel spray is disposed at an angle relative to a plane disposed perpendicular relative to the central bore axis 30. The angle is less than twenty degrees) (20°), and may include an angle of zero degrees (0°) when directly perpendicular (such as shown in FIGS. 8 and 9). However, as shown in FIG. 10, the angle may preferably include a value between the range of ten degrees (10°) and fifteen degrees (15°).

The combustion chamber 36 includes a contoured surface 46. Preferably and as shown, the contoured surface 46 is defined by an axial end surface 48 of the piston 32. However, it should be appreciated that the contoured surface 46 may be defined, for example, by a lower vertical surface of the cylinder head 26, disposed directly above the bore 28.

The contoured surface 46 defines a plurality of annular recesses 50. Each of the annular recesses 50 re-directs the linear path 42 of a portion of the fuel spray. The annular recesses 50 re-direct the fuel spray into a plurality of independent rotating vortices. The contoured surface 46 is shaped and/or formed to distribute the fuel spray from the fuel injector 40 into a plurality of equal portions 52, generally indicated by reference numeral 52. Each portion 52 of the fuel spray is directed toward at least one of the plurality of annular recesses 50. Each of the annular recesses 50 defines an annular flow path 54 to receive and re-direct the portion 52 of the fuel spray received therein. The annular flow path 54 of each of the annular recesses 50 re-directs the linear path 42 of the fuel spray into a rotating circular path that defines a vortex. Accordingly, as the fuel spray is injected into the combustion chamber 36, the fuel spray moves along the linear path 42 until the fuel spray contacts the contoured surface 46. Once the fuel spray initially contacts the contoured surface 46, the contoured surface 46 divides the stream of the fuel spray into portions 52, which are directed toward one or more of the annular recesses 50. Each of the annular recesses 50 further re-directs the flow of the fuel spray received therein into the rotating circular path, which thereby defines multiple vortices, i.e., one vortex for each annular recess 50. The multiple vortices increase a fuel/air mixing rate to provide a more uniformly and thoroughly mixed fuel/air mixture.

Each annular recess 50 includes an edge wall 56. The edge wall 56 of each annular recess 50 extends generally parallel with the central bore axis 30. Each edge wall 56 of each annular recess 50 if formed to define one of a re-entrant wall surface, such as shown in FIG. 3, an angled wall surface, such as shown in FIG. 5, or a straight wall surface, such as shown in FIG. 7.

Figure 2:
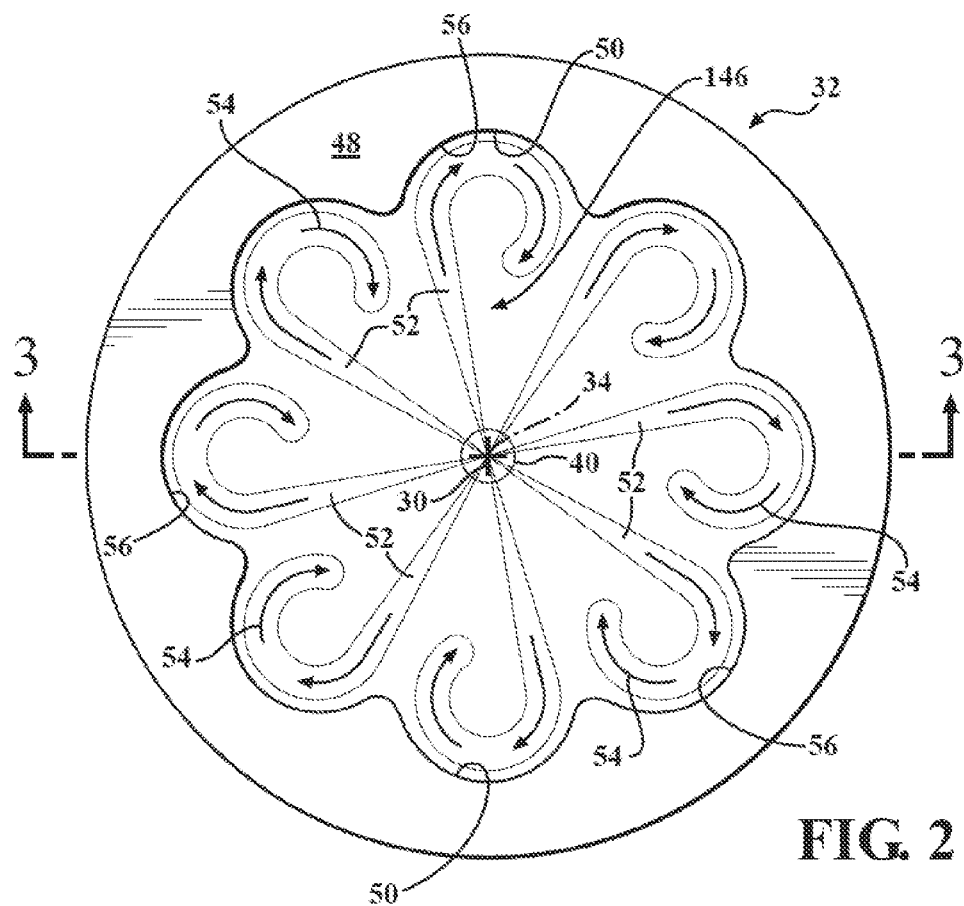
FIG. 2 is a plan view of a piston of the engine assembly showing a first embodiment of a contoured surface thereof perpendicular to a central bore axis.
Figure 3:
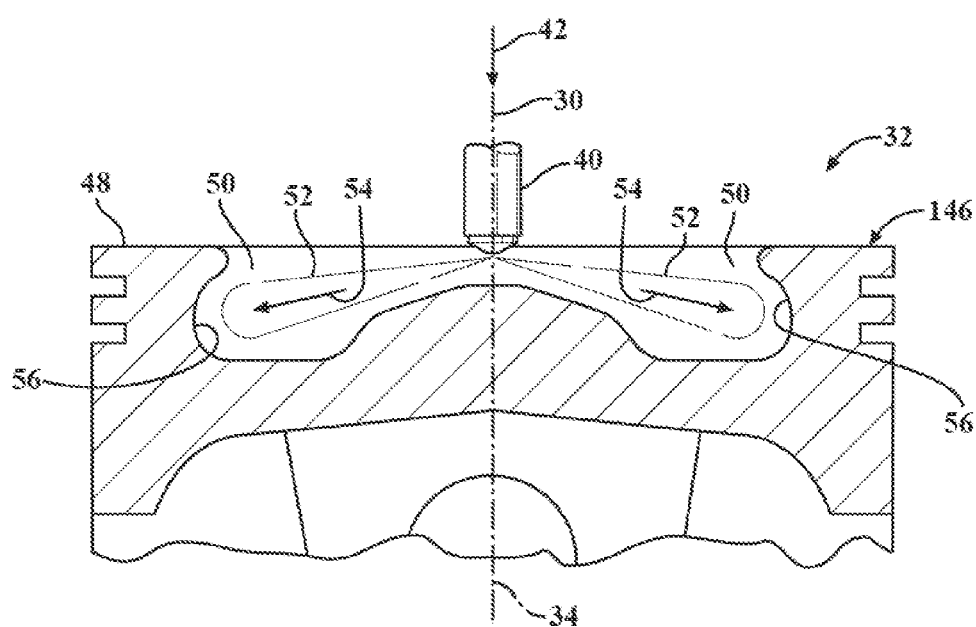
FIG. 3 is a cross sectional view of the first embodiment of the contoured surface parallel to the central bore axis.

Referring to FIGS. 2 and 3, a first embodiment of the contoured surface is generally shown at 146. As shown in FIGS. 2 and 3, the plurality of annular recesses 50 is arranged in opposing pairs. Each of the annular recesses 50 of the opposing pairs of annular recesses 50 is disposed opposite each other across the radial center 34 of the piston 32. Each annular recess 50 of each opposing pairs of the annular recesses 50 directs the portion 52 of the fuel spray received therein in the same rotational direction. As shown, the annular recesses 50 direct the fuel spray to rotate in a clockwise direction of rotation. However, it should be appreciated that the contoured surface 146 may alternatively direct the fuel spray to rotate in a counter-clockwise direction of rotation. As shown, the contoured surface 146 includes eight annular recesses 50 forming 4 opposing pairs of annular recesses 50. However, it should be appreciated that the relative numbers of the annular recesses 50 and the number of opposing pairs of annular recesses 50 may differ from that shown.

Figure 4:
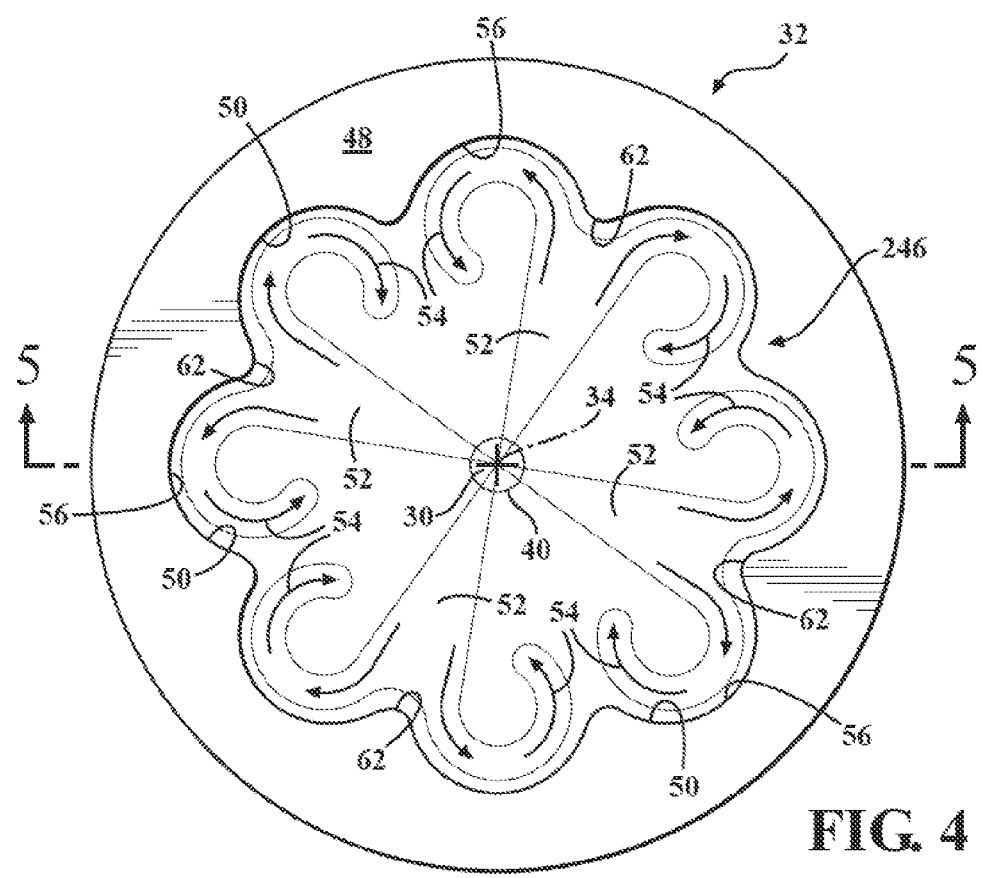
FIG. 4 is a plan view of the piston showing a second embodiment of the contoured surface thereof perpendicular to the central bore axis.
Figure 5:
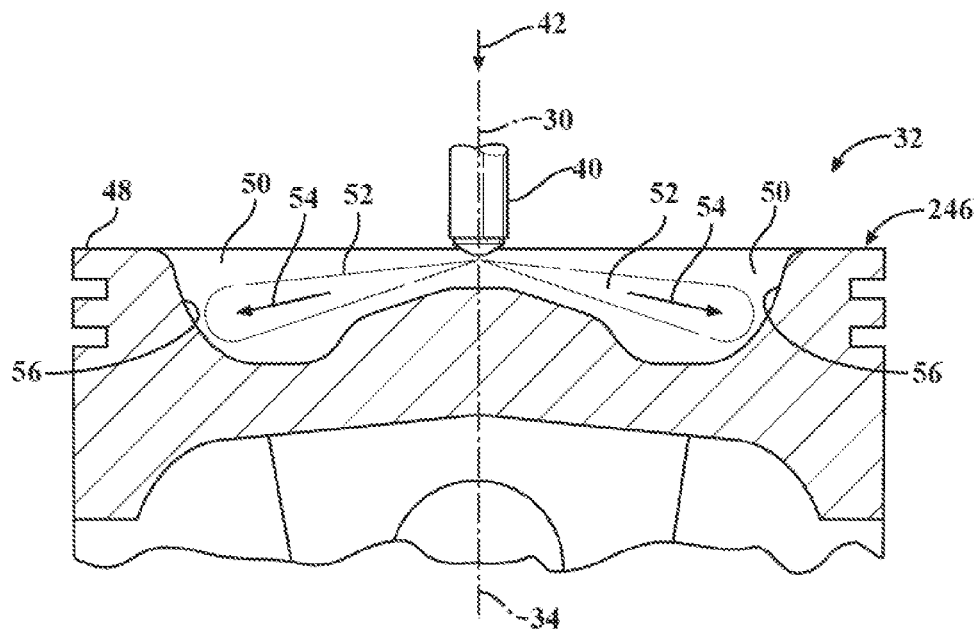
FIG. 5 is a cross sectional view of the second embodiment of the contoured surface parallel to the central bore axis.

Referring to FIGS. 4 and 5, a second embodiment of the contoured surface is generally shown at 246. As shown in FIGS. 4 and 5, the plurality of annular recesses 50 is arranged in adjoining pairs. The contoured surface 246 further defines a wedge 62, which is disposed between each annular recess 50 of each adjoining pair of annular recesses 50. The wedge 62 is contoured to divide the equal portion 52 of the fuel spray between each annular recess 50 of the adjoining pair of annular recesses 50. As such, the fuel spray initially contacts the contoured surface 246, which divides the fuel spray into equal portions 52. Each of the equal portions 52 is directed to one of the adjoining pair of annular recesses 50, whereupon the equal portion 52 of the fuel spray contacts the wedge 62, and is further divided between the two annular recesses 50 of the pair of adjoining annular recesses 50. It should be appreciated that instead of incorporating the wedge 62, the fuel system 38 may alternatively include a plurality of fuel injectors 40, with each of the fuel injectors 40 positioned to directly inject fuel into one of the annular recesses 50. One of each adjoining pair of annular recesses 50 directs the fuel spray in one of a clockwise rotational direction and a counter-clockwise rotational direction, and the other of the adjoining pair of annular recesses 50 directs the fuel spray in the other of the clockwise rotational direction and the counter-clockwise rotational direction. As such, each annular recess 50 of each pair of annular recesses 50 rotates the fuel spray received therein in opposing rotational directions, whereupon the momentum of each counteracts against the other to dissipate energy. As shown, the contoured surface 246 includes eight annular recesses 50 forming 4 adjoining pairs of annular recesses 50. However, it should be appreciated that the relative numbers of the annular recesses 50 and the number of adjoining pairs of annular recesses 50 may differ from that shown.

Figure 6:
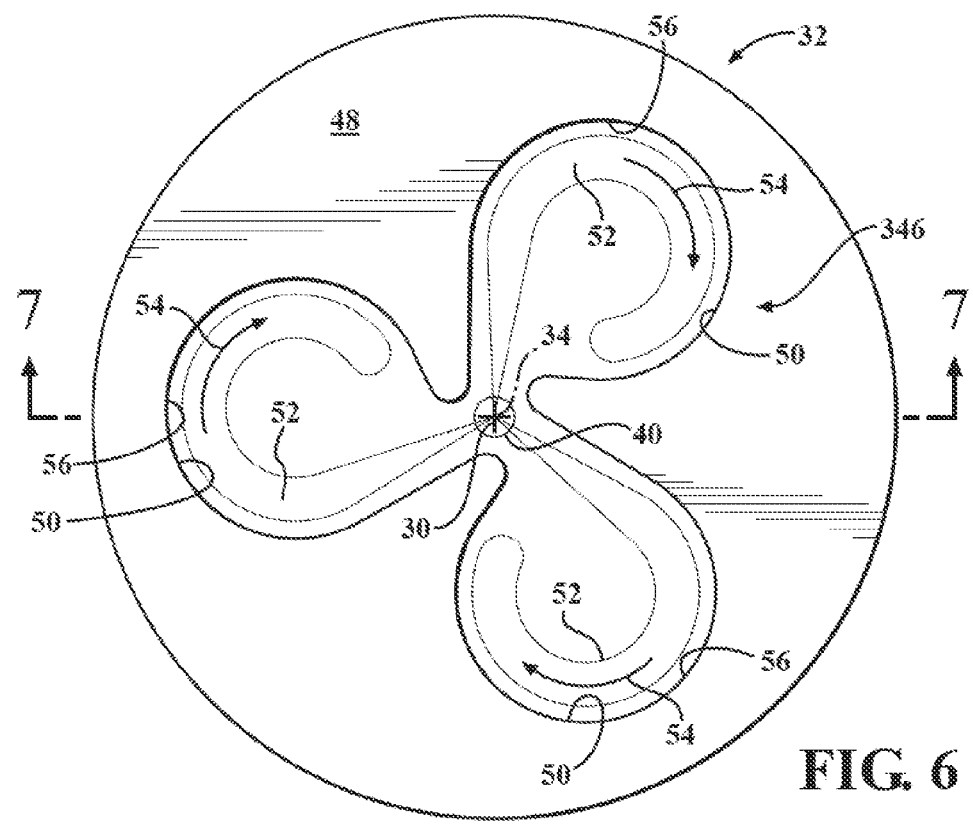
FIG. 6 is a plan view of the piston showing a third embodiment of the contoured surface thereof perpendicular to the central bore axis.
Figure 7:
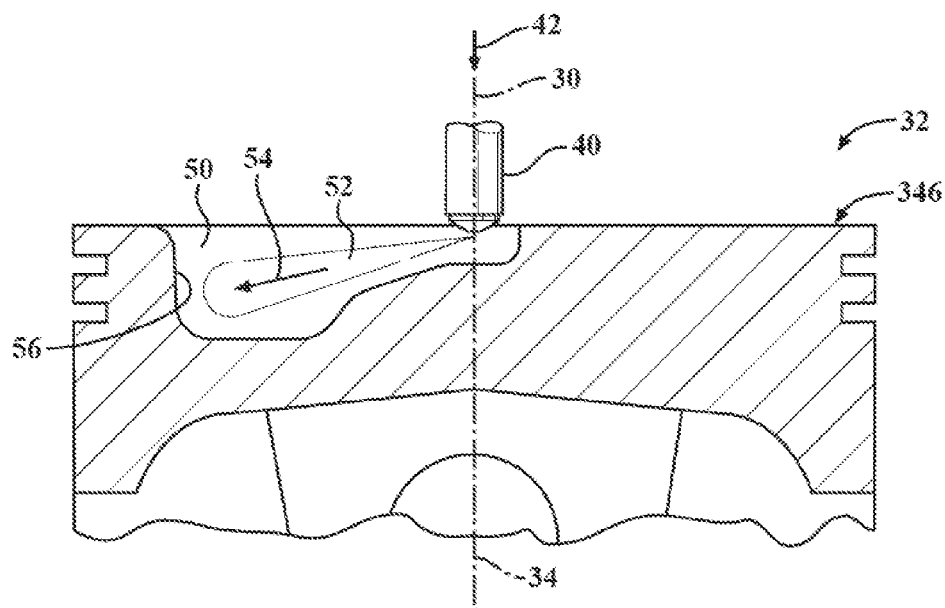
FIG. 7 is a cross sectional view of the third embodiment of the contoured surface parallel to the central bore axis.

Referring to FIGS. 6 and 7, a third embodiment of the contoured surface is generally shown at 346. The third embodiment of the contoured surface 346 shows that the contoured surface 346 may include an odd number of annular recesses 50. As shown in FIGS. 6 and 7, the contoured surface 346 includes three annular recesses 50.

Referring to FIGS. 8 and 9, a fourth embodiment of the contoured surface is generally shown at 446. As described in detail above, the fourth embodiment of the contoured surface 446 shows that the fuel injector 40 may be disposed perpendicular relative to the central bore axis 30. Furthermore, as best shown in FIG. 9, each of the annular recesses 50 may include a central domed region 64. The central domed region 64 extends axially outward along the central bore axis 30, and further defines the annular flow path 54, about which the fuel spray is directed to form the vortex.

Referring to FIG. 10, a fifth embodiment of the contoured surface is generally shown at 546. As described in detail above, the fifth embodiment of the contoured surface 546 shows that the fuel injector 40 may be slightly angled, such as at an angle of less than twenty degrees, relative to a plane that lies perpendicular to the central bore axis 30.

While the best modes for carrying out the invention have been described in detail, those familiar with the art to which this invention relates will recognize various alternative designs and embodiments for practicing the invention within the scope of the appended claims.

The invention claimed is:

1. An internal combustion engine comprising:
   an engine assembly defining a bore extending along a central bore axis;
   a piston disposed within the bore and configured for reciprocating movement within the bore along the central bore axis;
   wherein the piston and the engine assembly cooperate to define a combustion chamber;
   a direct injection fuel system having a fuel injector configured for injecting a fuel spray into the combustion chamber along a linear path; and
   wherein the combustion chamber includes a contoured surface defining a plurality of annular recesses configured for re-directing the linear path of the fuel spray into a plurality of independent rotating vortices, with each of the plurality of independent rotating vortices rotating about a respective rotation axis that is generally parallel with the central bore axis.

2. An internal combustion engine as set forth in claim 1 wherein the contoured surface is defined by an axial end surface of the piston.

3. An internal combustion engine as set forth in claim 2 wherein the contoured surface distributes the fuel spray from the fuel injector into a plurality of equal portions, with each portion of the fuel spray directed toward at least one of the plurality of annular recesses.

4. An internal combustion engine as set forth in claim 3 wherein each of the annular recesses defines an annular flow path for each equal portion of the fuel spray.

5. An internal combustion engine as set forth in claim 3 wherein each of the annular recesses includes a central domed region extending axially outward along the central bore axis.

6. An internal combustion engine as set forth in claim 3 wherein the plurality of annular recesses are arranged in adjoining pairs, and wherein the contoured surface defines a wedge disposed between each annular recess of each adjoining pair of annular recesses, wherein the wedge is contoured to divide the equal portion of the fuel spray between each annular recess of the adjoining pair of annular recesses.

7. An internal combustion engine as set forth in claim 6 wherein one of each adjoining pair of annular recesses directs the fuel spray in one of a clockwise rotational direction and a counter-clockwise rotational direction, and the other of the adjoining pair of annular recesses directs the fuel spray in the other of the clockwise rotational direction and the counter-clockwise rotational direction.

8. An internal combustion engine as set forth in claim 3 wherein the plurality of annular recesses are arranged in opposing pairs disposed opposite each other across a radial center of the piston.

9. An internal combustion engine as set forth in claim 8 wherein each annular recess of each pair of opposing annular recesses directs the equal portion of the fuel spray in the same rotational direction.

10. An internal combustion engine as set forth in claim 2 wherein each annular recess includes an edge wall extending generally parallel with the central bore axis.

11. An internal combustion engine as set forth in claim 10 wherein each edge wall of each annular recess is formed to define one of a straight wall surface, an angled wall surface, or a re-entrant wall surface.

12. An internal combustion engine as set forth in claim 1 wherein the linear path of the fuel spray is approximately parallel with the central bore axis.

13. An internal combustion engine as set forth in claim 12 wherein the linear path of the fuel spray includes a centerline centered at a radial center of the piston.

14. An internal combustion engine as set forth in claim 1 wherein the linear path of the fuel spray is approximately perpendicular to the central bore axis.

15. An internal combustion engine as set forth in claim 14 wherein the linear path of the fuel spray includes a centerline intersecting a radial center of the piston.

16. An internal combustion engine as set forth in claim 1 wherein the linear path of the fuel spray is disposed at an angle relative to a plane disposed perpendicularly relative to the central bore axis, wherein the angle is less than twenty degrees (20°).

17. An internal combustion engine as set forth in claim 16 wherein the angle is between the range of ten degrees (10°) and fifteen degrees (15°).

18. A method of operating an internal combustion engine, the method comprising:
   injecting a fuel spray along a linear path into a combustion chamber defined by a piston and an engine assembly;
   dividing the fuel spray into portions; and
   re-directing the linear path of each of the portions of the fuel spray into a plurality of independent rotating vortices that rotate about a respective rotational axis that is generally parallel with a central bore axis of the piston.

19. A method as set forth in claim 18 further comprising providing a contoured surface for the combustion chamber that defines a plurality of annular recesses, with each of the plurality of annular recesses configured for re-directing a portion of the fuel spray into rotating vortices.

20. A method as set forth in claim 19 wherein re-directing the linear path of each of the portions of the fuel spray into a plurality of independent rotating vortices includes re-directing each portion of the fuel spray into one of a clockwise rotational direction or a counter-clockwise rotational direction.

* * * * *